(12) United States Patent
Aoki et al.

(10) Patent No.: US 7,275,983 B2
(45) Date of Patent: Oct. 2, 2007

(54) SYSTEM FOR LIMITING AN INCREASE IN THE INSIDE AIR TEMPERATURE OF PASSENGER COMPARTMENT OF VEHICLE

(75) Inventors: Shinji Aoki, Chiryu (JP); Yasushi Yamanaka, Nakashima-gun (JP); Toshifumi Kamiya, Takahama (JP)

(73) Assignee: DENSO Corporation, Kariya (JP)

( * ) Notice: Subject to any disclaimer, the term of this patent is extended or adjusted under 35 U.S.C. 154(b) by 372 days.

(21) Appl. No.: 10/670,951

(22) Filed: Sep. 25, 2003

(65) Prior Publication Data
US 2004/0076015 A1   Apr. 22, 2004

(30) Foreign Application Priority Data
Sep. 27, 2002 (JP) .............................. 2002-283138
Oct. 4, 2002 (JP) .............................. 2002-292295

(51) Int. Cl.
*B60H 1/00* (2006.01)
(52) U.S. Cl. ........................... 454/75; 454/120; 62/244

(58) Field of Classification Search ................. 454/75, 454/120, 136, 137, 143, 156; 62/244
See application file for complete search history.

(56) References Cited

U.S. PATENT DOCUMENTS

| 5,414,306 A * | 5/1995 | Kanno et al. .................. 307/87 |
| 6,186,886 B1 * | 2/2001 | Farrington et al. ......... 454/141 |
| 6,407,365 B1 * | 6/2002 | De Prete, III ............... 219/203 |

FOREIGN PATENT DOCUMENTS

| JP | 04252730 A | * | 9/1992 |
| JP | 5-244731 | | 9/1993 |

* cited by examiner

*Primary Examiner*—Gregory Wilson
(74) *Attorney, Agent, or Firm*—Harness, Dickey & Pierce, PLC

(57) ABSTRACT

Light control glasses are used as window glasses of a vehicle. When the vehicle is parked, voltage is applied to the light control glass, which directly receives solar radiation from the sun, so that a light transmittancy of the light control glass is reduced to reduce the amount of solar radiation entered a passenger compartment of the vehicle.

15 Claims, 10 Drawing Sheets

SYSTEM FOR LIMITING AN INCREASE IN THE INSIDE AIR TEMPERATURE OF PASSENGER COMPARTMENT OF VEHICLE

CROSS REFERENCE TO RELATED APPLICATION

This application is based on and incorporates herein by reference Japanese Patent Application No. 2002-283138 filed on Sep. 27, 2002 and Japanese Patent Application No. 2002-292295 filed on Oct. 4, 2002.

BACKGROUND OF THE INVENTION

1. Field of the Invention

The present invention relates to a system for limiting an increase in the inside air temperature of a passenger compartment of a vehicle.

2. Description of Related Art

One previously proposed system for limiting an increase in the inside air temperature of a passenger compartment of a vehicle held in a parked state includes a ventilation fan, which is powered by a solar battery to expel hot air out of the passenger compartment of the vehicle. One such system is disclosed in, for example, Japanese Unexamined Patent Publication No. 5-244731.

However, in general, production of electricity from the solar battery is relatively small in comparison to production of electricity from an electric generator driven by a vehicle engine. Thus, the ventilation fan powered by the solar battery cannot efficiently expel the hot air out of the passenger compartment of the parked vehicle.

One calculation result indicates that the exhaust fan powered by the solar battery can reduce the inside air temperature of the passenger compartment only by 8 degrees Celsius at most. Thus, under the blazing sun in the summer where the inside air temperature of the vehicle reaches about 50 degrees Celsius, the invention disclosed in Japanese Unexamined Patent Publication No. 5-244731 cannot sufficiently reduce the inside air temperature of the passenger compartment.

Furthermore, according to the invention disclosed in Japanese Unexamined Patent Publication No. 5-244731, only the ventilation of the hot air from the passenger compartment through use of the ventilation fan powered by the solar battery is performed. Thus, due to, for example, radiation heat from interior members, such as seats, an instrument panel, and interior walls (interior trim), each of which has a relatively large thermal capacity, the inside air temperature of the passenger compartment may be increased once again. Thus, an increase in the inside air temperature of the passenger compartment of the parked vehicle cannot be efficiently limited.

SUMMARY OF THE INVENTION

The present invention addresses the above disadvantages. Thus, it is an objective of the present invention to provide a novel system for limiting an increase in the inside air temperature of a passenger compartment of a vehicle. It is another objective of the present invention to limit or resist an increase in the inside temperature of the passenger compartment of the vehicle held in a parked state.

To achieve the objective of the present invention, there is provided a system for limiting an increase in the inside air temperature of a passenger compartment of a vehicle. The system includes a solar radiation reducing means and a control means. The solar radiation reducing means is for reducing an amount of solar radiation, which enters the passenger compartment through at least one transparent panel of the vehicle. The control means is for controlling the solar radiation reducing means. When the control means determines that the vehicle is in a parked state, the control means operates the solar radiation reducing means to reduce the amount of solar radiation entered the passenger compartment through the at least one transparent panel.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
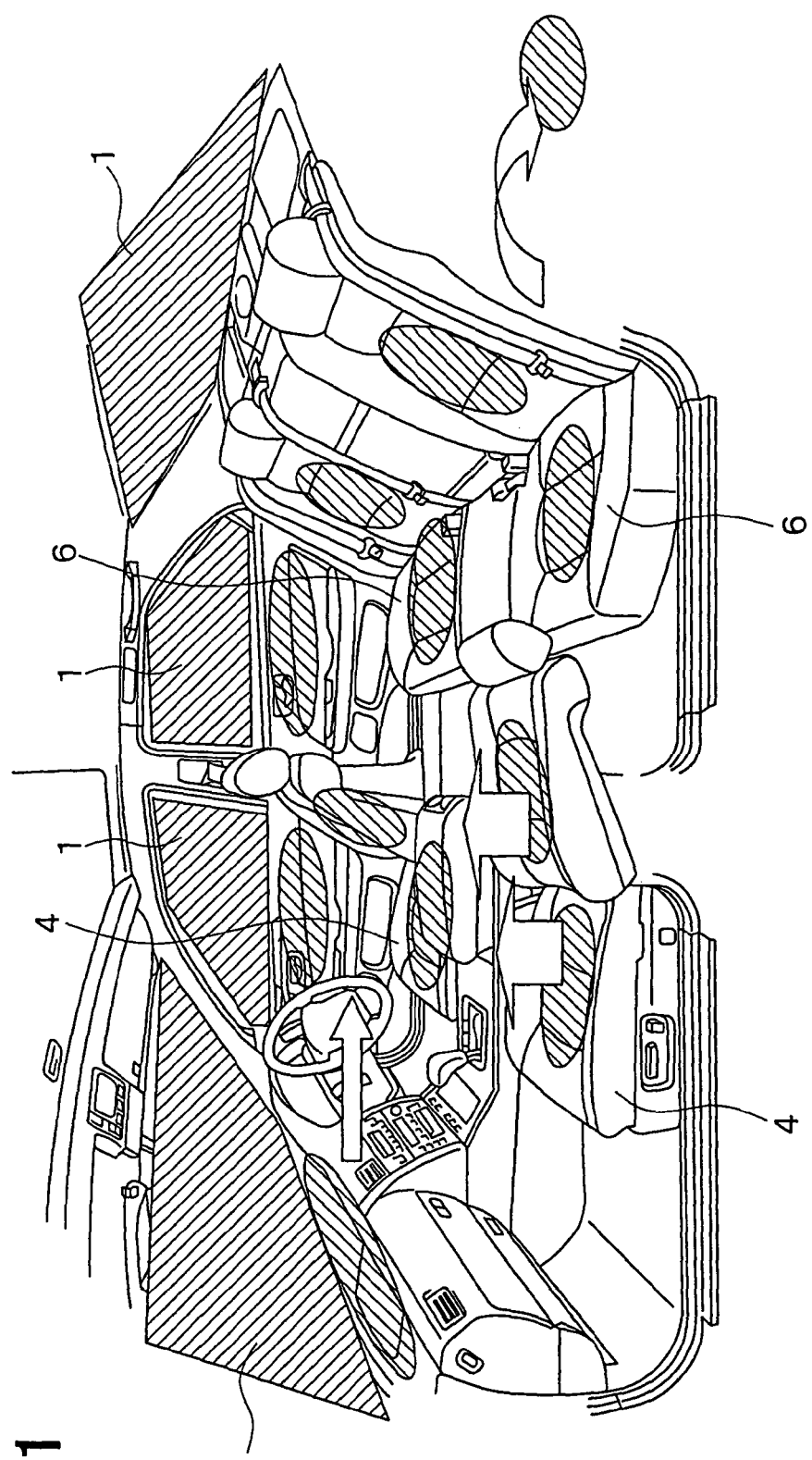
FIG. 1 is a descriptive view showing a structure of a passenger compartment according to an embodiment of the present invention.

A system for limiting an increase in the inside air temperature of a passenger compartment of a vehicle is implemented in a sedan type vehicle in the present embodiment. With reference to FIG. 1, window glasses are provided with a solar radiation reducing means 1 for reducing an amount of solar radiation, which enters the passenger compartment through the window glasses (serving as transparent panels). In the present embodiment, the solar radiation reducing means 1 is a voltage sensitive material, which is sensitive to voltage applied thereto and is provided to the corresponding window glass to form a light control glass. Thus, in the present embodiment, for the sake of convenience, the light control glass including the voltage sensitive material is indicated by the numeral 1. The light control glasses 1 are used as front, rear and side glasses of the vehicle. When voltage is applied to each glass (i.e., the voltage sensitive material provided to the glass) 1, a light transmittancy of the glass 1 is changed. That is, transparency of the glass is electrically controlled.

A vehicle air conditioning system adjusts the temperature of air to be blown into the passenger compartment to condition the air in the passenger compartment. In the present embodiment, the vehicle air conditioning system (serving as a ventilating means) includes a front side air conditioning unit 2 (FIG. 2), a rear side unit 3 (FIG. 3), a front seat air conditioning unit 5 (FIG. 2) and a rear seat air conditioning unit 7 (FIG. 3). The front side air conditioning unit 2 mainly conditions the air of the front side space of the passenger compartment. The rear side unit 3 (FIG. 3) conditions the air of the rear side space of the passenger compartment. The front seat air conditioning unit 5 (FIG. 2) blows air from a cover (outer surface) of a front seat 4 (FIG. 2), which is arranged in the front side of the passenger compartment. The rear seat air conditioning unit 7 blows air from a cover of a rear seat 6, which is arranged in the rear side of the passenger compartment.

It should be noted that the cover of the seat 4, 6 means a sheet-like material (or a skin-like material) exposed at the outer surface of the seat 4, 6 and does not necessarily mean a natural leather sheet.

Each of the front side air conditioning unit 2 and the rear side unit 3 includes a low pressure side heat exchanger 2a, 3a of a vapor compression refrigeration apparatus, a heater 2b, 3b and a blower 2c, 3c. The low pressure side heat exchanger 2a, 3a serves as an air cooling means for cooling the air to be discharged into the passenger compartment. The heater 2b, 3b is positioned downstream of the low pressure side heat exchanger 2a, 3a and heats the air to be discharged into the passenger compartment.

Figure 2:
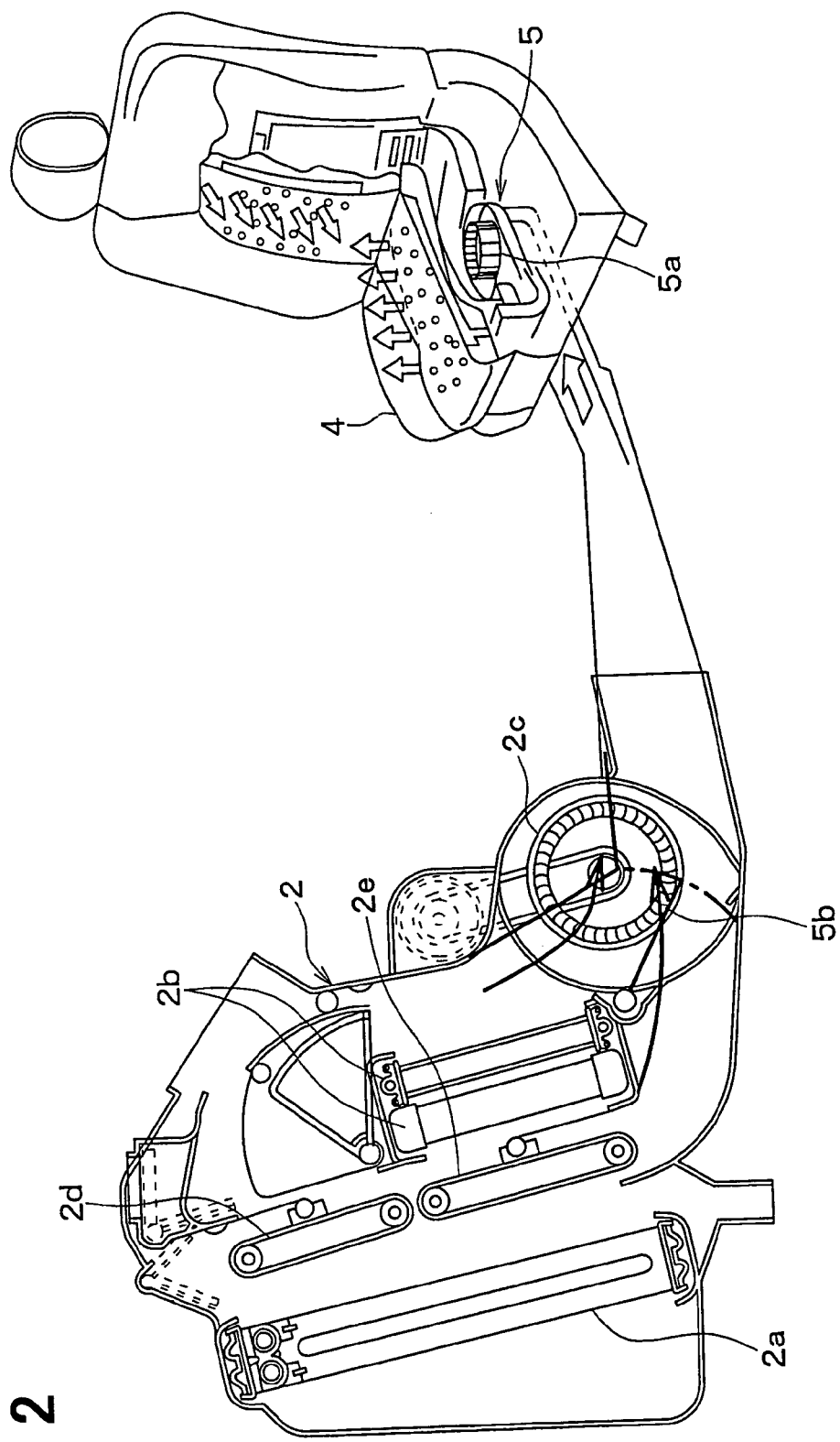
FIG. 2 is a descriptive view showing a structure of a front side air conditioning unit and a structure of a front seat air conditioning unit of a vehicle air conditioning system according to the embodiment.
Figure 3:
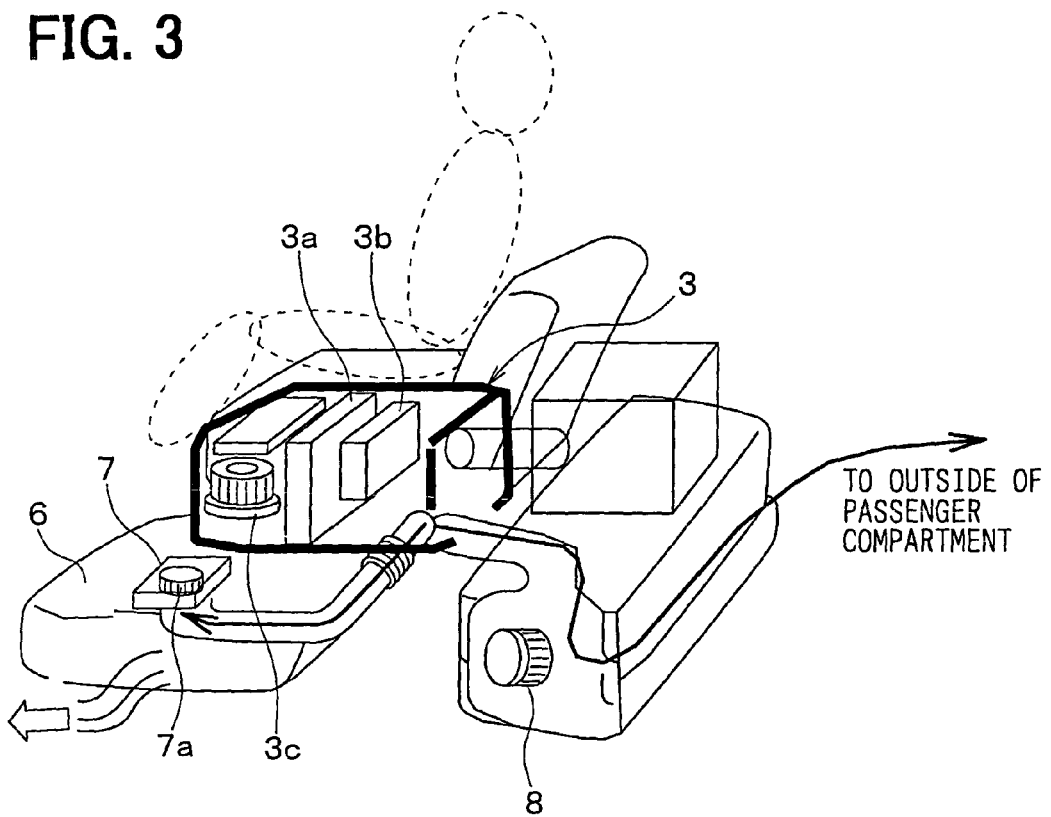
FIG. 3 is a descriptive view showing a structure of a rear side unit and a structure of a rear seat air conditioning unit of the vehicle air conditioning system.

With reference to FIG. 2, film doors 2d, 2e are arranged to serve as a fluid passage control means for controlling a flow of the air. The film door 2d controls an open area of an air passage of the low temperature air, which bypasses the heater 2b. The film door 2e controls an open area of an air passage of the high temperature air, which passes through the low pressure side heat exchanger 2a.

In the rear side unit 3 shown in FIG. 3, a fluid passage control means, which is equivalent to the film doors 2d, 2e, is omitted.

As shown in FIG. 2, the front seat air conditioning unit 5 takes, i.e. draws the temperature controlled air, which has been temperature controlled by the front side air conditioning unit 2, through use of a blower 5a arranged at the lower side of the seat 4 and discharges the drawn air through the cover of the seat 4. Similar to the front seat air conditioning unit 5, the rear seat air conditioning unit 7 (FIG. 3) draws the temperature controlled air, which has been temperature controlled by the rear side unit 3, through use of a blower 7a arranged at the lower side of the seat 6 and discharges the drawn air through the cover of the seat 6.

In the front seat air conditioning unit 5, a mixing ratio of the low temperature air and the high temperature air is adjusted by an air mix door 5b, which is provided in the front side air conditioning unit 2, to adjust the temperature of the air discharged from the seat 4. Here, the air mix door 5b serves as a temperature adjusting means for adjusting the temperature of the air discharged from the seat 4. In the rear side unit 3 shown in FIG. 3, a temperature adjusting means, which corresponds to the air mix door 5b, is omitted. In the present embodiment, a blower 8 for forcefully expelling the air out of the passenger compartment is provided in a trunk room of the vehicle.

Figure 4:
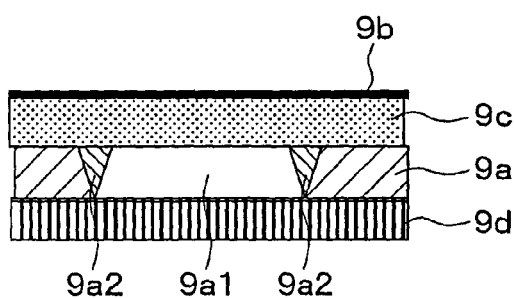
FIG. 4 is a descriptive view showing a structure of an interior trim of the present embodiment.

In the present embodiment, interior wall members, such as, a ceiling, pillars, seats, an instrument panel, a rear packet tray and vehicle doors, have a multi-layer structure, which includes a 3D net (three dimensional web structure) 9a, as shown in FIG. 4. The 3D net 9a forms a three dimensional ventilation structure having three dimensionally extending air holes 9a1, each of which is defined between the corresponding welded portions. Because of this, the air, which is blown from the front side air conditioning unit 2 and the rear side unit 3, can be discharged from, for example, the vehicle doors, the instrument panel and the ceiling (these components are indicated by shaded ellipses in FIG. 1).

Among the interior wall members, each of the ceiling and the pillars includes an exterior metal body 9b, a heat insulating layer (made of a resin material, such as polyester or polyurethane) 9c, the 3D net 9a and a design surface cover 9d, which are arranged in this order, as shown in FIG. 4. The design surface cover 9d includes a charged foundation back fabric, which is provided in an inside of the design surface cover 9d and forms a filter that removes dust particles and the like.

At the time of forming each air hole (duct) 9a1, which serves as an air passage provided in the wall member, a corresponding portion of the 3D net 9a is melted to form corresponding welded portions that serve as walls 9a2.

Characteristic operation of the present embodiment will be described.

When the vehicle is parked, and the outside air temperature outside the passenger compartment is increased to, for example, 20 degrees Celsius or higher, or the amount of solar radiation is increased to 150 W/m$^2$ or higher, voltage is applied to at least the light control glass 1, which receives the solar radiation directly from the sun. Thus, the light control glass 1, which receives a relatively large amount of solar radiation, has the reduced light transmittancy in comparison to the light control glass 1, which receives a relatively small amount of solar radiation. As a result, the solar radiation, which enters the passenger compartment, is shaded to reduce the amount of solar radiation entered the passenger compartment.

At this time, it is understood that voltage can be applied to all the light control glasses 1 to make the light transmittancy of the light control glass 1, which receives the relatively large amount of solar radiation, substantially equal to the light transmittancy of the light control glass 1, which receives the relatively small amount of solar radiation.

Figure 5:
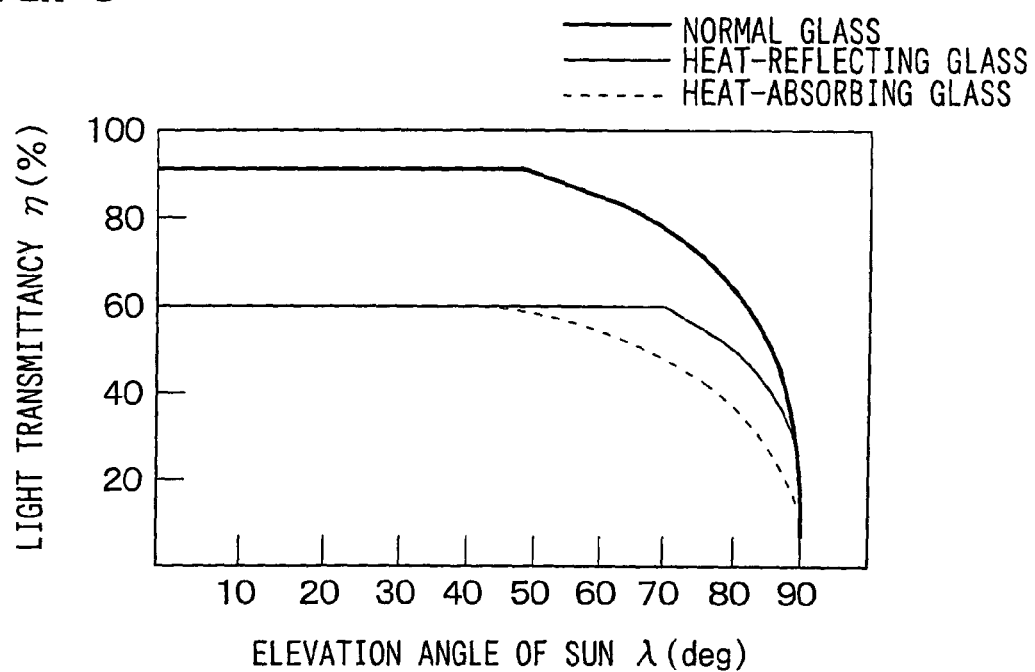
FIG. 5 is a graph showing a relationship between an elevation angle of the sun and a light transmittancy.
Figure 6:
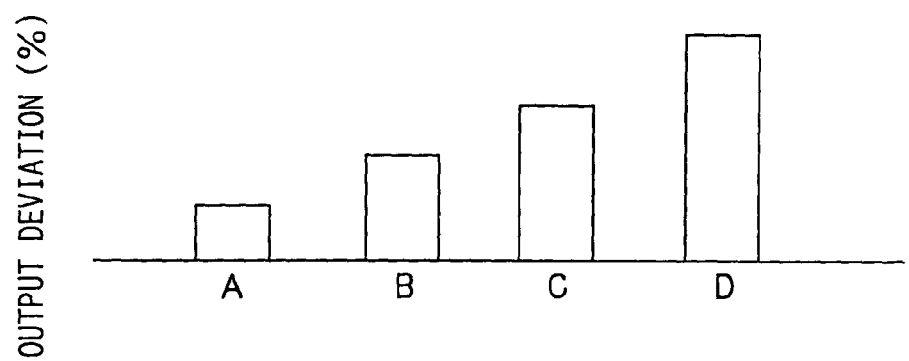
FIG. 6 is a graph showing a relationship between various types of glasses and an output deviation of a solar radiation sensor.
Figure 7:
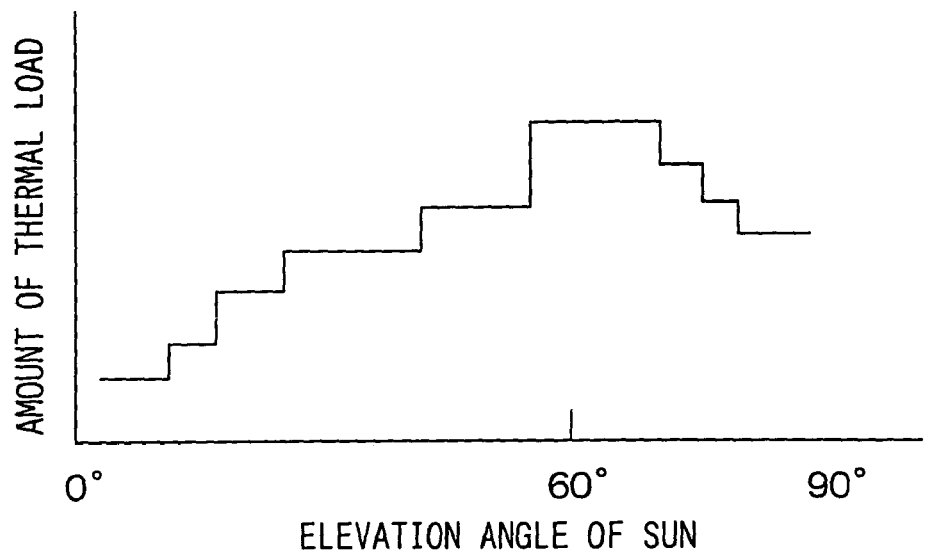
FIG. 7 is a graph showing a relationship between the elevation angle of the sun and an amount of thermal load.
Figure 8:
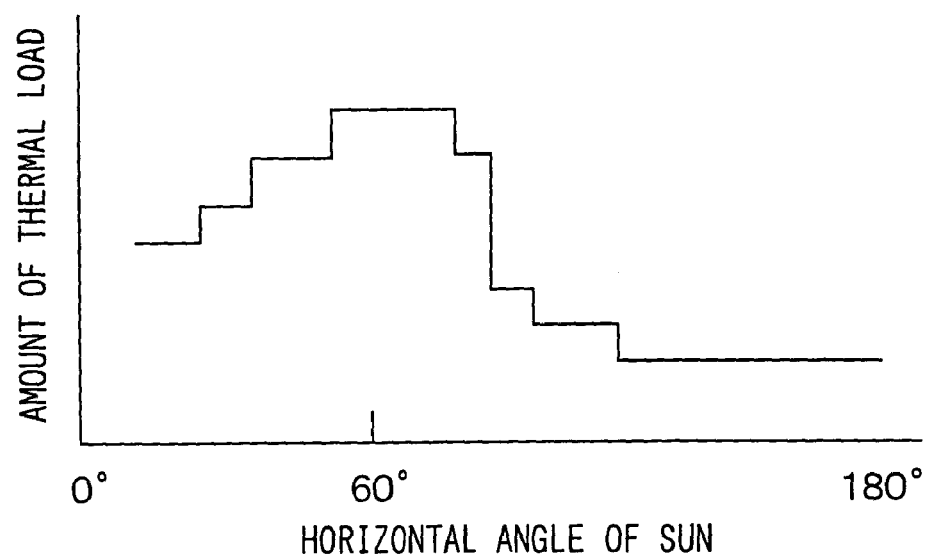
FIG. 8 is a graph showing a relationship between a horizontal angle of the sun and the amount of thermal load.

FIG. 5 is a graph showing a relationship between an elevation angle λ of the sun relative to the passenger compartment and the light transmittancy of the light control glass 1. FIG. 6 is a graph showing a relationship between various types of glasses and an output deviation of a solar radiation sensor, illustrating effects of glass characteristics on the solar radiation sensor output. The data shown in FIG. 6 is taken on a clear day where 700-800 W/m$^2$ of solar radiation is measured. In FIG. 6, "A" indicates a bronze color glass of heat-reflecting type, "B" indicates a blue color glass of heat-absorbing type, "C" indicates a green color glass of heat-absorbing type, and "D" indicates a green color glass of high performance heat-absorbing type. FIG. 7 is a graph showing a relationship between the elevation angle of the sun and the amount of thermal load. As shown in FIG. 7, the amount of thermal load reaches the maximum value at the elevation angle of 60 degrees irrespective of the horizontal angle of the sun. FIG. 8 is a graph showing a relationship between a horizontal angle of the sun and the amount of thermal load. As shown in FIG. 8, the amount of thermal load reaches the maximum value at the horizontal angle of 60 degrees irrespective of the elevation angle of the sun. As is obvious from these graphs, the voltage applied to each light control glass 1, i.e., the light transmittancy of each light control glass 1 needs to be controlled to make the amount of solar radiation entered into the passenger compartment equal to or less than a predetermined amount upon consideration of the type of glass used as the light control glass 1, the elevation angle of the sun, the horizontal angle of the sun and the like.

Figure 9:
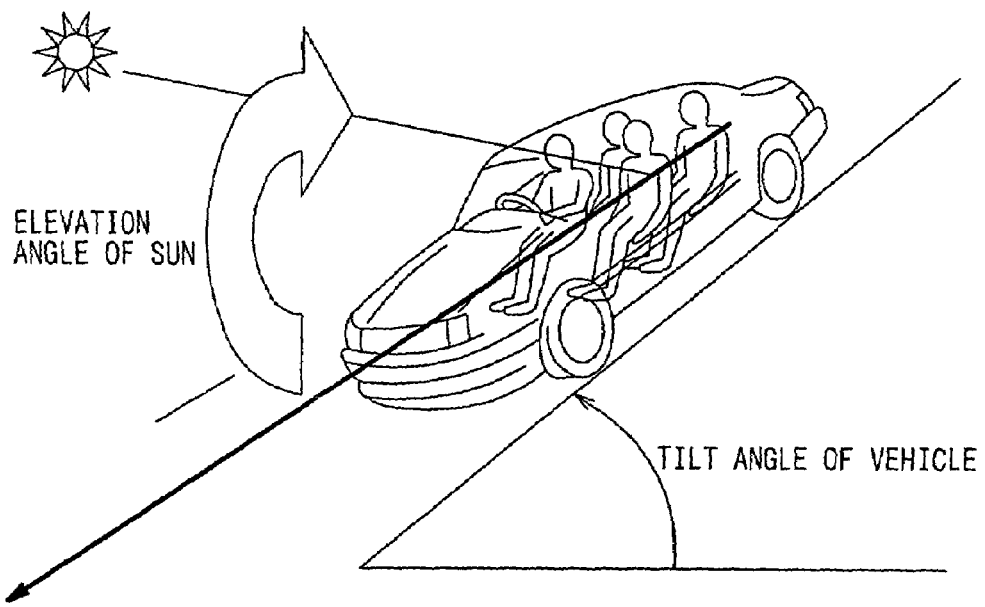
FIG. 9 is a diagram showing definition of the elevation angle of the sun according to the embodiment.
Figure 10:
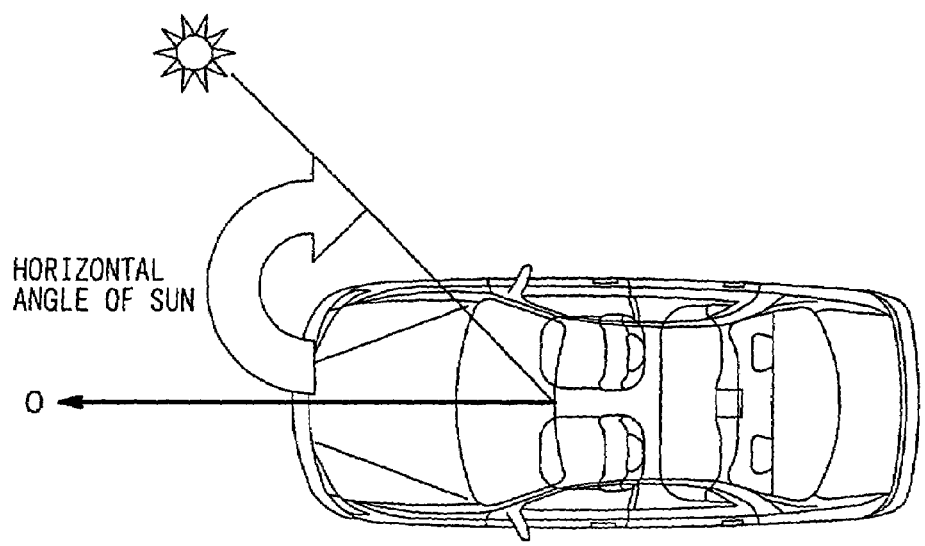
FIG. 10 is a diagram showing definition of the horizontal angle of the sun according to the embodiment.

In this embodiment, as shown in FIG. 9, the elevation angle of the sun is an angle indicating a direction of the sun relative to a vehicle fore-aft direction upon consideration of a tilt angle of the vehicle relative to the horizontal plane. As shown in FIG. 10, the horizontal angle of the sun is an angle of the sun measured in the right direction (the clockwise direction in FIG. 10) in the horizontal plane relative to a forwardly extending component of the vehicle fore-aft direction.

Figure 11:
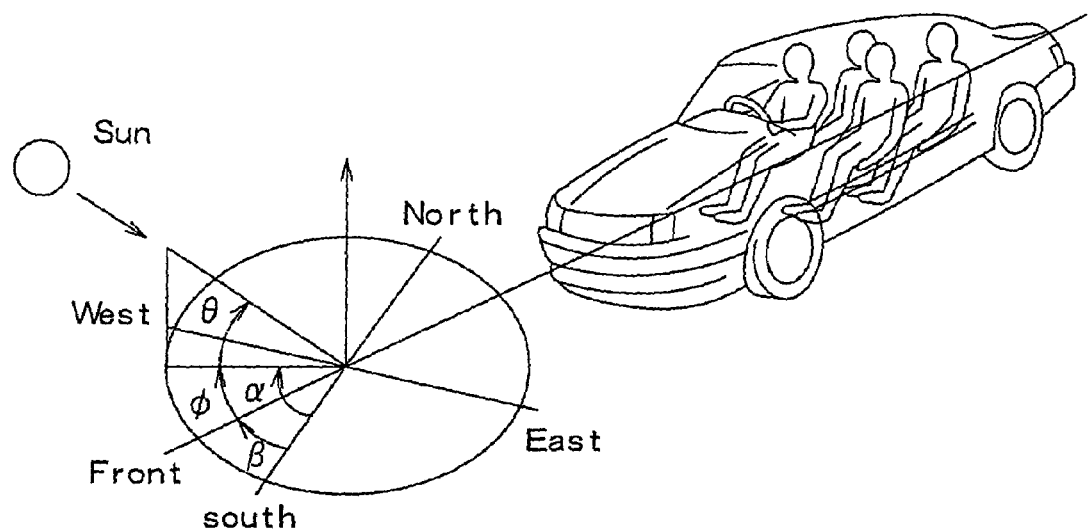
FIG. 11 is a descriptive view for computing a direction of the sun.

FIG. 11 is a descriptive view for computing a direction of the sun and an intensity of solar radiation. The elevation angle of the sun, the horizontal angle of the sun and the intensity of solar radiation can be obtained based on the following equations.

$$\sin \theta = \sin \eta \sin \sigma + \cos \eta \cos \sigma \cos t$$

$$\sin \alpha = \cos \eta \sin t / \cos \theta$$

$$\phi = \alpha - \beta$$

$$I = I_o p^{1/\sin \theta}$$

In the above equations, "$\theta$" is the elevation angle of the sun, "$\eta$" is the latitude, "$\sigma$" is the declination, "$t$" is the time, "$\alpha$" is the azimuth, "$\phi$" is the horizontal angle of the sun, "$I$" is the intensity of solar radiation, "$\beta$" is the moving direction of the vehicle with respect to the south direction, "$P$" is the transmissivity of the atmosphere, "$I_o$" is the amount of radiation measured outside the atmosphere. Here, the elevation angle of the sun can be calculated based on the latitude and longitude of the vehicle, the sun's carrier, the current time and the moving direction of the vehicle (the orientation of the parked vehicle). The latitude and longitude of the vehicle and the position of the parked vehicle are measured through the Global Positioning System (GPS), and the orientation of the parked vehicle is computed based on the output of a gyroscope or the output of the GPS measured at the time of driving the vehicle and is obtained based on the stored map information stored in the car navigation system and the amount of solar radiation, which directly enters the passenger compartment and is measured through the solar radiation sensor. Alternatively, a plurality of solar radiation sensors can be provided, and the elevation angle of the sun can be computed based on differences between the outputs of the solar radiation sensors.

In the present embodiment, upon switching the front side air conditioning unit to an outside air intake mode, the light transmittancy of the light control glass 1 is reduced to shade the solar radiation, and at the same time the blowers 5a, 7a of the front and rear seat air conditioning units 5, 7 are driven to ventilate the passenger compartment.

The rear seat air conditioning unit 7 of the present embodiment has only an inside air circulation mode and has no outside air intake mode, so that the outside air is not actively introduced into the rear side of the passenger compartment. However, when the rear seat air conditioning unit 7 is constructed to have the outside air intake mode, the rear seat air conditioning unit 7 can be operated in the outside air intake mode to drive the blower 7a.

Furthermore, in the present embodiment, in addition to the blowers 5a, 7a of the front and rear seat air conditioning units 5, 7, the blower 2c of the front side air conditioning unit 2 and the blower 3c of the rear side unit 3 are driven to increase the ventilation performance.

In the present embodiment, in the parked state of the vehicle, an air blow rate (i.e., an air flow rate) of the blower 2c is set to about 160 m³/h, and an air blow rate of the blower 3c is set to about 80 m³/h. Furthermore, an air blow rate (i.e., an air flow rate) of the blowers 5a, 7a is set to about 40 m³/h.

In the present embodiment, when a start switch (e.g., an ignition switch) of the vehicle is turned off, the vehicle is determined to be in the parked state. Also, when the start switch is turned on, the vehicle is determined to be in a state other than the parked state. Furthermore, the measured value of the solar radiation sensor of the vehicle air conditioning system is used as the amount of solar radiation of the present embodiment, and the measured value of the outside air temperature sensor of the vehicle air conditioning system is used as the outside air temperature of the present embodiment.

Figure 13:
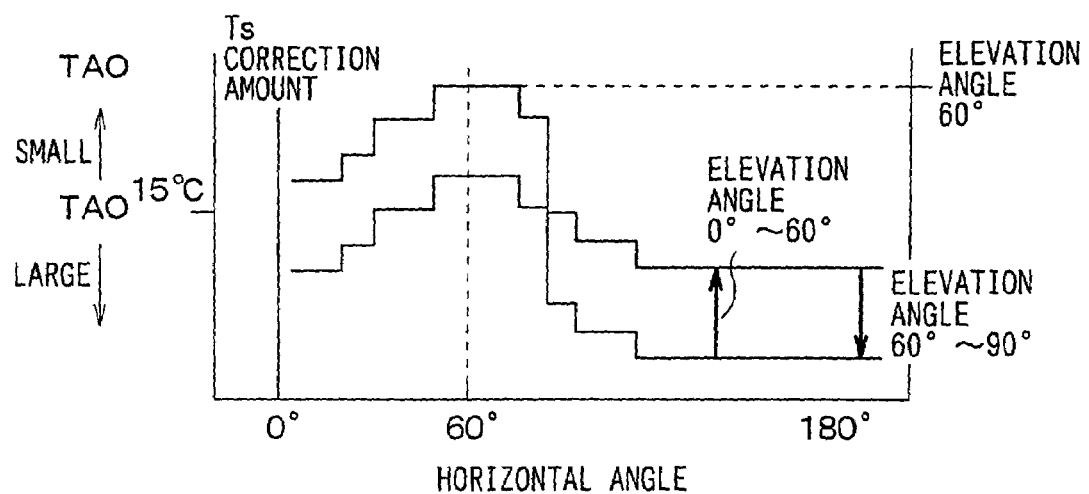
FIG. 13 is a graph showing a relationship between a target outlet air temperature and the horizontal angle of the sun.
Figure 12:
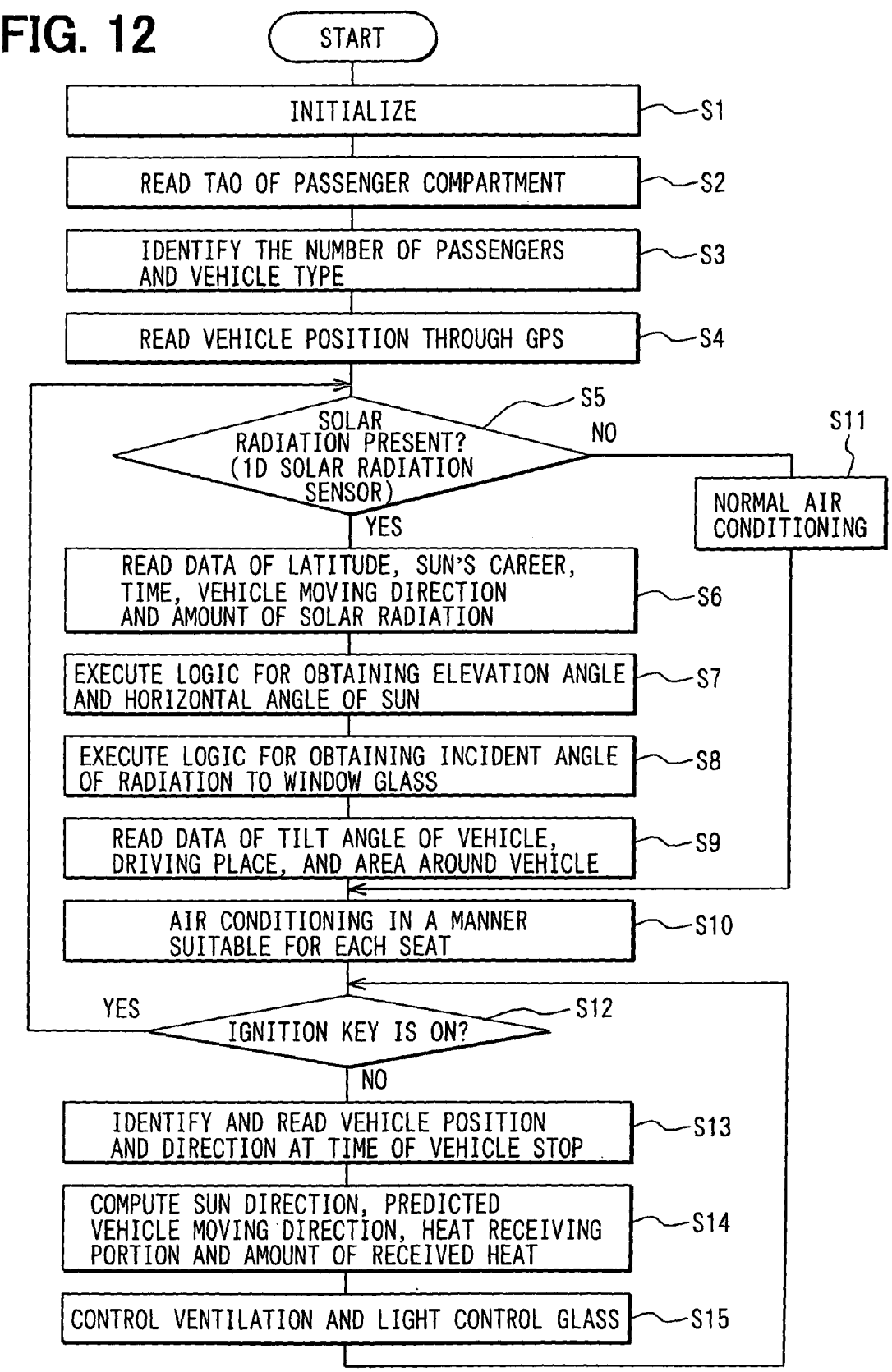
FIG. 12 is a flowchart showing operation of the air conditioning system according to the embodiment.

FIG. 12 is a flowchart showing the above operation (S12-S15) of the air conditioning system. Here, the steps S12-S15 are performed by an electronic control unit (serving as a control means). At the time of normal operation (S11), a target outlet air temperature TAO of the air conditioning system is corrected based on the horizontal angle of the sun and the elevation angle of the sun, as shown in FIG. 13. The data shown in FIG. 13 is obtained under the following conditions, i.e., the solar radiation of 500 W/m² and the outside temperature of 25 degrees Celsius. The target outlet air temperature TAO is a target air conditioning control temperature determined by the following equation:

$$TAO = Kset \times Tset - Kr \times Tr - Kam \times Tam - Ks \times Ts + C$$

Here, KSet, Kr, Kam and Ks are control gains, and Tr is the inside air temperature of the passenger compartment. Furthermore, Tam is the outside air temperature, and C is a correction coefficient.

Next, advantages of the present embodiment will be described.

In the parked state of the vehicle, the amount of solar radiation entered the passenger compartment is reduced by the light control glass 1, so that it is possible to limit an increase in the temperature of the interior members, such as the seats, the instrument panel and the interior walls (interior trim) of the passenger compartment, which have a relatively large thermal capacity. Therefore, it is possible to limit reincreasing of the temperature of the air in the passenger compartment caused by, for example, radiation heat from the seats and the instrument panel.

Figure 14:
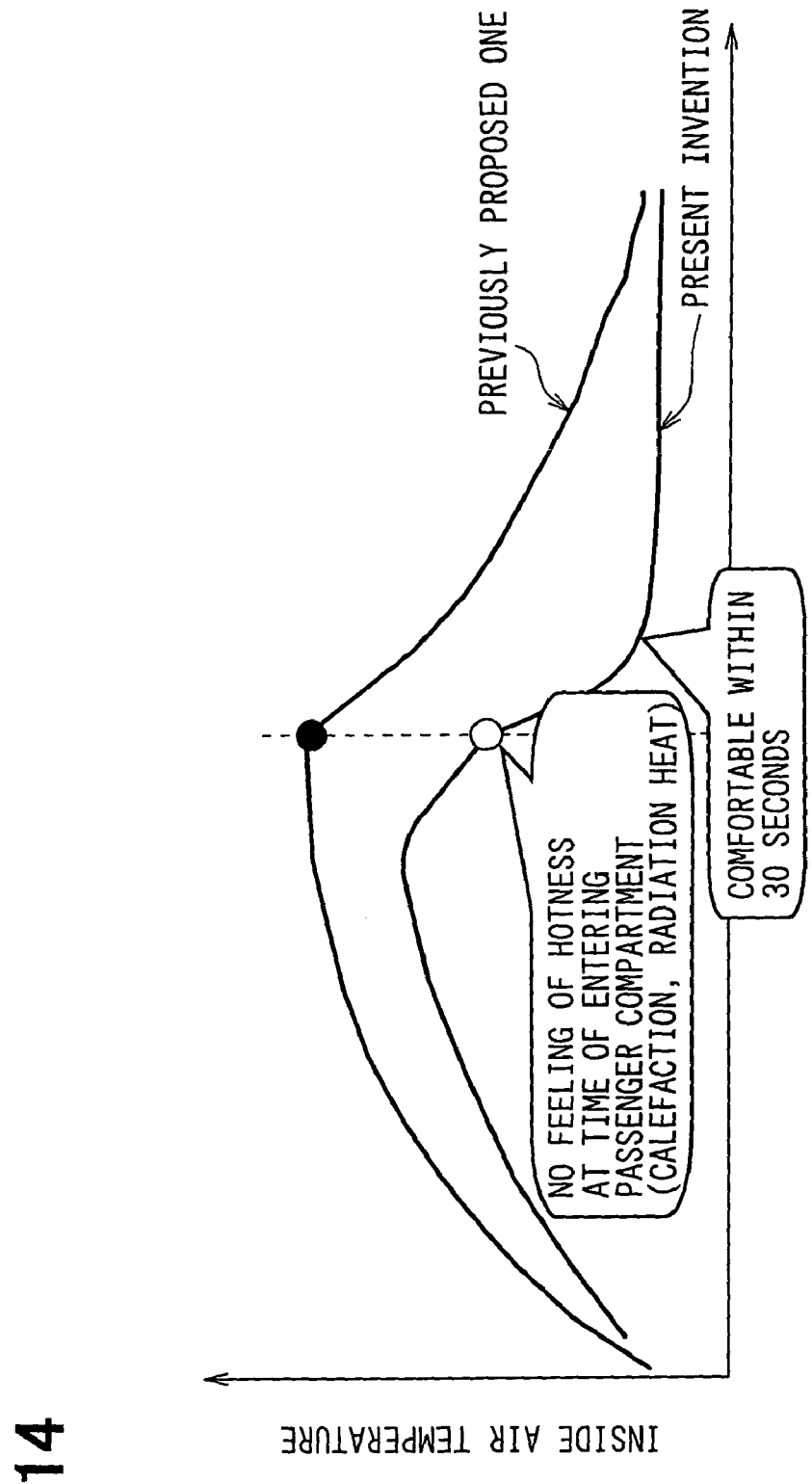
FIG. 14 is a graph showing a change in the inside air temperature of the passenger compartment.

As a result, as shown in FIG. 14, the temperature of the passenger compartment can be reduced to a comfortable level in the early stage. Thus, it is possible to immediately provide the comfortable space to the passenger, and also it is possible to reduce the power consumption of the vehicle air conditioning system (vapor compression refrigeration apparatus).

Furthermore, because of the ventilation of the parked vehicle, the hot air can be expelled out of the passenger compartment, so that the temperature of the passenger compartment can be quickly reduced to the comfortable level.

Furthermore, in the parked state of the vehicle, the light transmittancy of the window glass, which receives the solar radiation directly from the sun, is reduced with the first priority. Thus, it is possible to limit an increase in the power consumption required to change the light transmittancy of the light control glass 1, and also it is possible to effectively reduce the amount of solar radiation entered the passenger compartment, i.e., the amount of thermal load applied by the solar radiation.

The wall members of the passenger compartment include the 3D net 9a. Thus, the relatively high heat insulating performance is obtained by the air stored in the 3D net 9a, and at the time of, blowing the air, e.g., at the time of ventilating the air, the air can be distributed to the entire passenger compartment through the 3D net 9a, which functions as ducts. Thus, the air blow efficiency (ventilation efficiency) can be improved, and the inside air temperature of the passenger compartment can be quickly reduced at the quick cooling operation, so that the passenger can experience the comfortable sensation of air conditioning.

OTHER EMBODIMENT

In the above embodiment, the amount of solar radiation entered into the passenger compartment is shaded by the solar radiation reducing means, such as the light control glass 1, and the ventilation operation of the passenger compartment is simultaneously performed. However, the present invention is not limited to this. For example, the ventilation of the passenger compartment can be performed when the inside air temperature of the passenger compartment becomes equal to or greater than a predetermined temperature, when the amount of solar radiation applied to the vehicle becomes equal to or greater than a predetermined amount, and/or when the outside air temperature outside the passenger compartment becomes equal to or greater than a predetermined temperature. Here, desirably, the predetermined amount of solar radiation is a cumulative amount of solar radiation measured since the time of initiating the parking of the vehicle.

Furthermore, in the above embodiment, in addition to the blowers 5a, 7a of the seat air conditioning units 5, 7, the blower 2c of the front side air conditioning unit 2 and the blower 3c of the rear side unit 3 are also driven to perform the ventilation of the passenger compartment. However, the present invention is not limited to this. For example, only the blowers 5a, 7a of the seat air conditioning units 5, 7 can be driven without driving the blower 2c of the front side air conditioning unit 2 and the blower 3c of the rear side unit 3. Alternatively, only the blower 2c of the front side air conditioning unit 2 and the blower 3c of the rear side unit 3 can be driven without driving the blowers 5a, 7a of the seat air conditioning units 5, 7.

At this time, when the ventilation is performed through the blowers 5a, 7a of the seat air conditioning units 5, 7, a relatively high degree of body sensation can be achieved with the relatively small power. Thus, it is desirable to use the blowers 5a, 7a of the seat air conditioning units 5, 7 when one of the set of the blowers 5a, 7a and the set of the blowers 2c, 3c needs to be selected.

Furthermore, the engine and the refrigeration apparatus of the vehicle air conditioning system can be started when the passenger who has just returned to the parked vehicle operates any switch (e.g., a door knob or an accessory switch) of the vehicle in the parked state of the vehicle, in which the solar radiation is shaded. With this modification, the inside air temperature of the passenger compartment can be reduced in the early stage.

In the above embodiment, the light control glass (more specifically, the voltage sensitive material) is used as the solar radiation reducing means 1. However, the present invention is not limited to this. For example, in place of each light control glass, an electric sunshade arrangement, which includes a shade curtain and an electric motor, can be used as the solar radiation reducing means 1. In this instance, for the sake of convenience, each object indicated by the numeral 1 in FIG. 1 should be regarded as the shade curtain. The shade curtain (cloth) 1 shades the solar radiation (sunlight) entered into the passenger compartment through the window glass. The shade curtain is rolled up and down by the electric motor, which is, in turn, controlled by the control unit (control means). Furthermore, both the light control glass and the sunshade arrangement can be used in combination.

Figure 15:
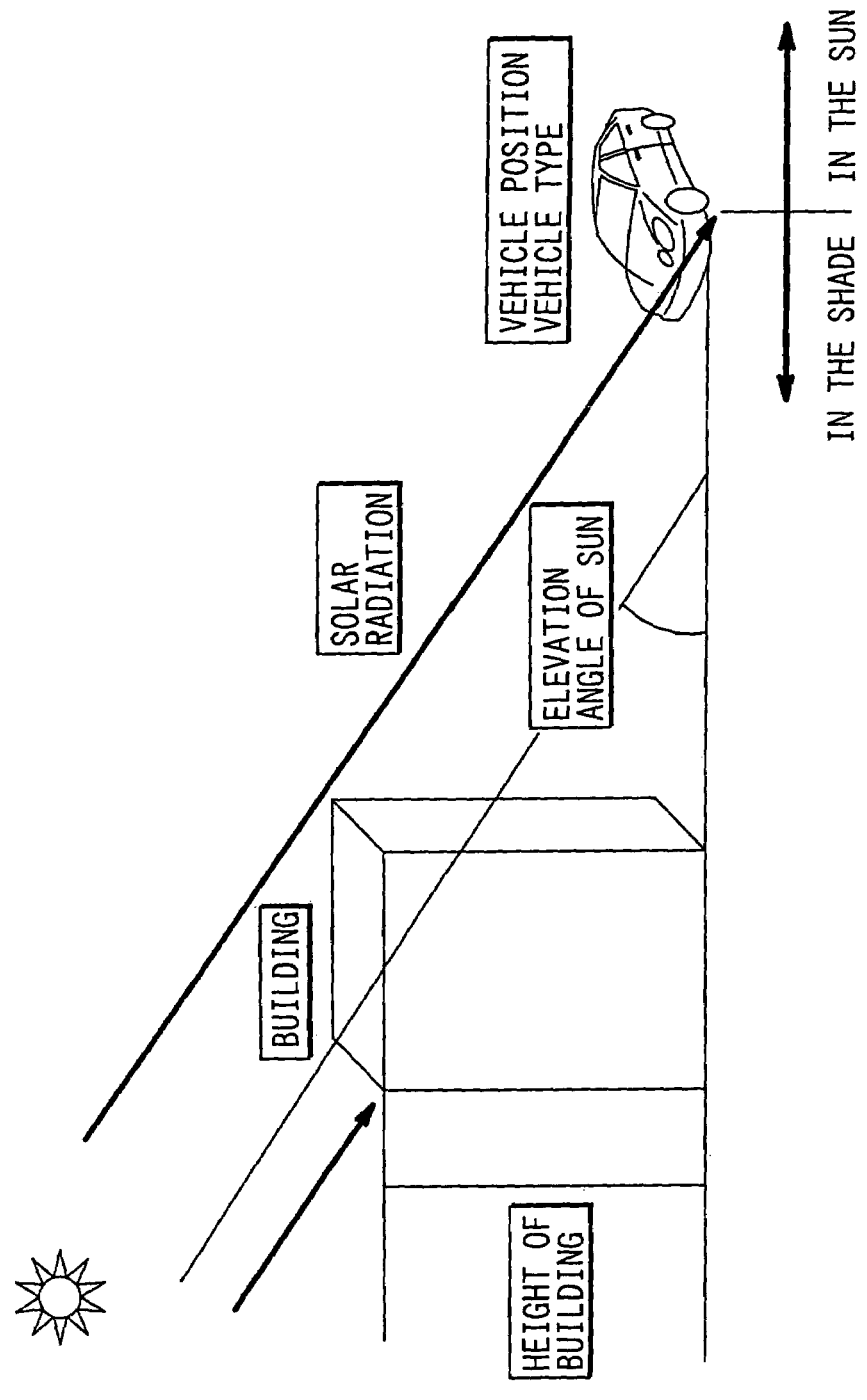
FIG. 15 is a descriptive view for computing the elevation angle of the sun.

Furthermore, at the time of computing the elevation angle of the sun, the vehicle could be shaded by, for example, a building, as shown in FIG. 15. In such a case, the map information and the measured value of the solar radiation sensor can be used to correct the elevation angle of the sun.

Furthermore, when the ventilation of the passenger compartment of the parked vehicle is performed, the ventilation of the passenger compartment is preferably performed such that at least the illuminated part of the passenger compartment, which is directly illuminated by the solar radiation, has an increased air flow rate that is greater than that of the rest of the passenger compartment.

Also, in the above embodiment, the light transmittancy of the window glass, which directly receives the solar radiation from the sun, is reduced with the first priority. However, the present invention is not limited to this. For example, the light transmittancy of at least the driver's seat side window glass (i.e., the glass located adjacent the driver's seat) can be reduced.

Furthermore, in the above embodiment, the solar radiation is shaded when the outside air temperature reaches 20 degrees Celsius or higher, or when the amount of solar radiation becomes 150 W/m$^2$ or higher. Alternatively, the position of the sun can be measured by the GPS or the internal calendar. The solar radiation reducing means (i.e., the light control glass or the sunshade arrangement) can be operated to reduce the amount of solar radiation entered the passenger compartment through the window glasses when the position of the sun relative to the vehicle is within a predetermined range.

Furthermore, in the above embodiment, when the voltage is applied to the light control glass, the light transmittance of the light control glass is reduced. Alternatively, it is possible to use another type of light control glass, which does not provide the shade when voltage is applied to the light control glass. When the voltage is removed from such a light control glass, the light control glass reduces the light transmittancy.

Additional advantages and modifications will readily occur to those skilled in the art. The invention in its broader terms is therefore not limited to the specific details, representative apparatus, and illustrative examples shown and described.

What is claimed is:

1. A system for limiting an increase in the inside air temperature of a passenger compartment of a vehicle, the system comprising:

a solar radiation reducing means for reducing an amount of solar radiation, which enters the passenger compartment through at least one transparent panel of the vehicle;

a control means for controlling the solar radiation reducing means, wherein when the control means determines that the vehicle is in a parked state, the control means operates the solar radiation reducing means to reduce the amount of solar radiation entered the passenger compartment through the at least one transparent panel; and a ventilating means for ventilating the passenger compartment, wherein:

the control means operates the solar radiation reducing means to reduce the amount of solar radiation entering the passenger compartment through the at least one transparent panel when at least one of the following conditions is satisfied:

the inside air temperature of the passenger compartment of the vehicle held in the parked state is equal to or greater than a predetermined temperature;

the outside air temperature outside the passenger compartment of the vehicle held in the parked state is equal to or greater than a predetermined temperature;

the amount of solar radiation entered the passenger compartment of the vehicle held in the parked state is equal to or greater than a predetermined amount;

the control means operates the ventilating means to ventilate the passenger compartment when the at least one of the conditions is satisfied;

the at least one transparent panel includes at least one window glass;

the solar radiation reducing means includes a voltage sensitive material. which is sensitive to voltage applied thereto and is provided to each of the at least one window glass;

the voltage sensitive material changes a light transmittance of the corresponding window glass upon application of voltage to the voltage sensitive material; and the control means controls application of the voltage to the voltage sensitive material of at least one of the at least one window glass such that the voltage sensitive material reduces the light transmittance of the corresponding window glass when the vehicle is held in the parked state.

2. The system according to claim 1, wherein the solar radiation reducing means reduces the amount of solar radiation only at a side of the passenger compartment, at which solar radiation is directly received from the sun.

3. The system according to claim 1, wherein the at least one of the at least one window glass is located adjacent a driver's seat of the vehicle.

4. The system according to claim 1, wherein the ventilating means ventilates the passenger compartment by discharging air through an opening provided in a surface of at least one interior wall of the passenger compartment.

5. The system according to claim 4, wherein the at least one interior wall of the passenger compartment includes at least one of a wall of a door, a wall of an instrument panel and a wall of a ceiling of the passenger compartment.

6. The system according to claim 1, wherein:

the ventilating means includes an air conditioning system, which includes a blower; and the control means drives the blower to ventilate the passenger compartment when the at least one of the conditions is satisfied.

7. The system according to claim 6, wherein the blower blows air outwardly through a surface of a seat placed in the passenger compartment.

8. The system according to claim 1, wherein:

the ventilating means includes an air conditioning system, which has a refrigeration apparatus;

when any switch provided in the passenger compartment is turned on, the control means drives the air conditioning system, so that the passenger compartment is ventilated by the air cooled by the refrigeration apparatus.

9. The system according to claim 1, wherein the control means operates the solar radiation reducing means to reduce the amount of solar radiation entered the passenger compartment through the at least one transparent panel when a position of the sun relative to the vehicle is within a predetermined range.

10. The system according to claim 1, wherein:

the solar radiation reducing means includes an electrically driven sunshade arrangement, which is provided to each of the at least one transparent panel and includes a curtain and an electric motor for driving the curtain; and the control means drives the sunshade arrangement of at least one of the at least one transparent panel such that the curtain of the sunshade arrangement covers at least a portion of the corresponding transparent panel when the vehicle is held in the parked state.

11. The system according to claim 1, wherein:

the control means determines that the vehicle is in the parked state when a start switch for starting an engine of the vehicle is turned off; and the control means determines that the vehicle is not in the parked state when the start switch is turned on.

12. A system for limiting an increase in the inside air temperature of a passenger compartment of a vehicle, the system comprising:

a solar radiation reducing means for reducing an amount of solar radiation, which enters the passenger compartment through at least one transparent panel of the vehicle;

a control means for controlling the solar radiation reducing means, wherein when the control means determines that the vehicle is in a parked state, the control means operates the solar radiation reducing means to reduce the amount of solar radiation entered the passenger compartment through the at least one transparent panel; and a ventilating means for ventilating the passenger compartment, wherein:

the control means operates the solar radiation reducing means to reduce the amount of solar radiation entering the passenger compartment through the at least one transparent panel when at least one of the following conditions is satisfied:

the inside air temperature of the passenger compartment of the vehicle held in the parked state is equal to or greater than a predetermined temperature;

the outside air temperature outside the passenger compartment of the vehicle held in the parked state is equal to or greater than a predetermined temperature; and the amount of solar radiation entered the passenger compartment of the vehicle held in the parked state is equal to or greater than a predetermined amount;

the control means operates the ventilating means to ventilate the passenger compartment when the at least one of the conditions is satisfied; and the control means determines that the amount of solar radiation entered the passenger compartment of the vehicle held in the parked state is equal to or greater than the predetermined amount when a cumulative amount of solar radiation, which has entered the passenger compartment and has been measured since time of initiating parking of the vehicle, reaches a predetermined cumulative amount.

13. A system for limiting an increase in the inside air temperature of a passenger compartment of a vehicle, the system comprising:

a solar radiation reducing means for reducing an amount of solar radiation, which enters the passenger compartment through at least one transparent panel of the vehicle;

a control means for controlling the solar radiation reducing means, wherein when the control means determines that the vehicle is in a parked state, the control means operates the solar radiation reducing means to reduce the amount of solar radiation entered the passenger compartment through the at least one transparent panel; and a ventilating means for ventilating the passenger compartment, wherein:

the control means operates the solar radiation reducing means to reduce the amount of solar radiation entering the passenger compartment through the at least one transparent panel when at least one of the following conditions is satisfied:

the inside air temperature of the passenger compartment of the vehicle held in the parked state is equal to or greater than a predetermined temperature;

the outside air temperature outside the passenger compartment of the vehicle held in the parked state is equal to or greater than a predetermined temperature; and the amount of solar radiation entered the passenger compartment of the vehicle held in the parked state is equal to or greater than a predetermined amount;

the control means operates the ventilating means to ventilate the passenger compartment when the at least one of the conditions is satisfied; and the ventilating means is operated to provide a larger amount of air to a side of the passenger compartment, at which solar radiation is directly received from the sun, in comparison to the rest of the passenger compartment.

14. A system for limiting an increase in the inside air temperature of a passenger compartment of a vehicle, the system comprising:

a solar radiation reducing means for reducing an amount of solar radiation, which enters the passenger compartment through at least one transparent panel of the vehicle; and a control means for controlling the solar radiation reducing means, wherein when the control means determines that the vehicle is in a parked state, the control means operates the solar radiation reducing means to reduce the amount of solar radiation entered the passenger compartment through the at least one transparent panel;

a vehicle air conditioning unit, which conditions air in the passenger compartment and includes a vapor compression refrigeration apparatus and a blower; and a seat air conditioning unit, which is provided to a seat of the passenger compartment and includes a blower, wherein:

when the control means operates the solar radiation reducing means to reduce the amount of solar radiation entered the passenger compartment through the at least one transparent panel, the control means also operates the vehicle air conditioning unit and the seat air conditioning unit in such a manner that the vehicle air conditioning unit is operated in an outside air intake mode to take outside air located outside the passenger compartment and to adjust the temperature of the outside air, and the blower of the seat air conditioning unit is operated to take the temperature conditioned outside air supplied from the vehicle air conditioning unit and to blow the temperature conditioned outside air outwardly through a surface of the seat.

15. The system according to claim 14, wherein:

the refrigeration apparatus of the vehicle air conditioning unit includes a heat exchanger;

upon operation of the solar radiation reducing means to reduce the amount of solar radiation entered the passenger compartment through the at least one transparent panel, when an any switch provided in the passenger compartment is turned on, the control means starts an engine of the vehicle and operates the heat exchanger of the vapor compression apparatus to reduce the inside air temperature of the passenger compartment.

* * * * *